US012509923B2

(12) United States Patent
Suholutskaja et al.

(10) Patent No.: US 12,509,923 B2
(45) Date of Patent: Dec. 30, 2025

(54) MOTOR VEHICLE LOCK, IN PARTICULAR MOTOR VEHICLE DOOR LOCK

(71) Applicant: KIEKERT AKTIENGESELLSCHAFT, Heiligenhaus (DE)

(72) Inventors: Elena Suholutskaja, Düsseldorf (DE); Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 49 days.

(21) Appl. No.: 18/699,713

(22) PCT Filed: Sep. 28, 2022

(86) PCT No.: PCT/DE2022/100721
§ 371 (c)(1),
(2) Date: Apr. 9, 2024

(87) PCT Pub. No.: WO2023/061529
PCT Pub. Date: Apr. 20, 2023

(65) Prior Publication Data

US 2024/0410205 A1 Dec. 12, 2024

(30) Foreign Application Priority Data

Oct. 13, 2021 (DE) ..................... 10 2021 126 475.8

(51) Int. Cl.
*E05B 81/68* (2014.01)
*E05B 85/24* (2014.01)
*E05B 85/26* (2014.01)

(52) U.S. Cl.
CPC ............ *E05B 81/68* (2013.01); *E05B 85/243* (2013.01); *E05B 85/26* (2013.01)

(58) Field of Classification Search
CPC ......... E05B 81/68; E05B 85/243; E05B 85/26
(Continued)

(56) References Cited

U.S. PATENT DOCUMENTS 5,564,761 A * 10/1996 Mizuki .................. E05B 81/20 292/201
5,785,364 A * 7/1998 Kleefeldt ............. E05F 15/632 292/201

(Continued)

FOREIGN PATENT DOCUMENTS

DE 102009003402 A1 8/2010
DE 102019107572 A1 10/2020
WO WO-2020105264 A1 * 5/2020 ............ E05B 81/66

OTHER PUBLICATIONS

International Search Report mailed Jan. 2, 2023, for priority International Application No. PCT/DE2022/100721.

*Primary Examiner* — Nathan Cumar
(74) *Attorney, Agent, or Firm* — Renner, Otto, Boisselle & Sklar, LLP

(57) ABSTRACT

A motor vehicle lock, in particular a motor vehicle door lock, the basic construction of which is equipped with a locking mechanism consisting essentially of a rotary latch and a pawl as locking mechanism components. Moreover, at least one sensor for sensing the position of the rotary latch and the pawl is implemented. Furthermore, at least one contact element, which is biased by a spring, is implemented between the sensor and the associated locking mechanism component. The contact element is designed to rotate about an axis. According to the invention, the spring is mounted on the contact element and equipped with limbs on both sides for an interaction with the rotary latch and a housing stop.

18 Claims, 6 Drawing Sheets

(58) Field of Classification Search
USPC .................................................................. 70/141
See application file for complete search history.

(56) References Cited

U.S. PATENT DOCUMENTS

| | | | | |
|---|---|---|---|---|
| 8,186,730 | B2 * | 5/2012 | Berghahn ................ | E05B 81/14 292/216 |
| 8,403,379 | B2 * | 3/2013 | Ishiguro .................. | E05B 81/06 292/216 |
| 8,480,138 | B2 * | 7/2013 | Bendel .................... | E05B 77/36 292/216 |
| 8,894,106 | B2 * | 11/2014 | Vazquez ................. | E05B 81/68 292/201 |
| 9,085,922 | B2 * | 7/2015 | Tiemann ................. | E05B 77/04 |
| 10,072,445 | B2 * | 9/2018 | Barmscheidt ........... | E05B 79/10 |
| 10,458,158 | B2 * | 10/2019 | Takagi .................. | E05B 77/283 |
| 10,604,970 | B2 * | 3/2020 | Briggs .................... | E05B 81/14 |
| 11,920,385 | B2 * | 3/2024 | Nakatsuka .............. | E05B 85/24 |
| 2001/0050484 | A1 * | 12/2001 | Kobayashi .............. | E05B 85/26 292/216 |
| 2012/0292927 | A1 * | 11/2012 | Vazquez ................. | B23P 11/00 292/200 |
| 2014/0091581 | A1 * | 4/2014 | Taurasi ................... | E05B 15/04 292/215 |
| 2015/0061301 | A1 * | 3/2015 | Torka ...................... | E05B 85/20 292/194 |
| 2017/0268264 | A1 * | 9/2017 | Suzumura ............... | E05B 85/02 |
| 2018/0058116 | A1 * | 3/2018 | Erices ..................... | E05B 83/18 |
| 2018/0216374 | A1 * | 8/2018 | Hunt ....................... | E05B 85/26 |
| 2024/0410205 | A1 * | 12/2024 | Suholutskaja .......... | E05B 85/26 |

* cited by examiner

MOTOR VEHICLE LOCK, IN PARTICULAR MOTOR VEHICLE DOOR LOCK

This application is a national phase of International Patent Application No. PCT/DE2022/100721 filed Sep. 28, 2022, which claims priority to German Patent Application No. 10 2021 126 475.8 filed Oct. 13, 2021, each of which is hereby incorporated herein by reference in its entirety.

FIELD OF DISCLOSURE

The invention relates to a motor vehicle lock, in particular a motor vehicle door lock, with a locking mechanism comprising substantially the locking mechanism components, rotary latch and pawl, further with at least one sensor for sensing the position of the rotary latch and the pawl, and with at least one contact element biased by a spring between the sensor and the associated locking mechanism component, wherein the contact element is designed to be rotatable about an axis.

BACKGROUND OF DISCLOSURE

The adoption of the different locking positions and particularly a main locking position of a locking mechanism, particularly in motor vehicle door locks and their detection, is of particular importance. This is because the function of safety components, for example the function of a side airbag, a belt tightener, etc., is usually linked to the main locking position. This aspect is all the more important as motor vehicle doors are often equipped with a closing aid for reasons of comfort or because of their weight, in order to provide motorized support for the closing process of the relevant motor vehicle door, which is initiated manually.

A motor vehicle door lock with a closing drive is described, for example, in DE 10 2009003402 A1. In this case, a closing lever acting on the rotary latch is realized. A closing lever switch is provided to determine the functional position of the closing lever. In addition, a functional position of the pawl can be detected using a pawl switch. In addition, the closing lever acts as a contact member of the closing lever switch that senses a control cam of the rotary latch.

This allows a functional position of the rotary latch to be determined. Due to the different switch positions, the respective functional status of the locking mechanism can be recorded and evaluated using a control unit. However, the associated design and circuitry complexity is high due to the plurality of switches to be queried.

For this reason, the further and generic prior art according to U.S. Pat. No. 5,785,364 uses a contact element which actuates a switch. However, the switch as a sensor is ultimately only layered to query the position of the rotary latch. An additional position query of the pawl is not possible. For this purpose, the contact element has an arm which is biased by the rotary latch to actuate the switch. As a result, only limited statements can be made about the functional position of the individual locking mechanism components and particularly the pawl.

In the generic prior art according to DE 10 2019 107 572 A1, one variant uses a contact element designed to rotate relative to an axis. The contact element is not only biased by a spring, but also has a pawl contour and a rotary latch contour for sensing the closing position of the pawl on the one hand and the closing position of the rotary latch on the other. Each time at least one locking mechanism component deviates from its closed position, the contact element biases the sensor.

The prior art has proven itself in principle, but still offers room for improvement. In fact, the interaction between the known contact element and the associated spring is relatively complex and also requires a specific and very special spring geometry. This spring geometry must be substantially maintained and work reliably over the totality of the service life of the associated motor vehicle. This also applies to changing and possibly fluctuating temperatures and humid environments. In practice, this can result in functional impairments.

SUMMARY OF DISCLOSURE

The invention is based on the technical problem of further developing a motor vehicle lock and, in particular, a motor vehicle door lock in such a manner that the functional reliability is increased and, in particular, is also made available over long time scales.

To solve this technical problem, the invention proposes that the spring acting on the contact element is mounted on the contact element and is equipped with limbs on both sides for interaction with the rotary latch on the one hand and a housing stop on the other hand in a motor vehicle lock of the same type and in particular a motor vehicle door lock.

The contact element is advantageously designed as a two-arm lever with a pawl lever arm and a rotary latch lever arm. The pawl lever arm typically has a pawl contour for sensing the pawl. In contrast, the rotary latch lever arm is designed in such a manner that it can interact with the sensor.

In this manner, the contact element can sense the pawl with the help of the pawl lever arm and the pawl contour provided there. In contrast, the rotary latch is scanned using the spring. For this purpose, the spring is typically designed as a torsion spring with a torsion latch limb and housing limb. Both limbs are generally opposite to one another in relation to a central winding portion. In addition, the design is advantageously such that both limbs are each connected tangentially to the winding portion and substantially enclose an angle of approximately 180° between them.

The winding portion generally encloses a bearing collar of the contact element. The bearing collar is typically embraced by the winding portion, coaxially. The bearing collar is also provided on the rotary latch arm of the contact element. Accordingly, the spring is mounted on the relevant rotary latch arm.

In addition, the design is usually such that the torsion latch limb of the spring passes through a guide slot on the contact element. Since the contact element is equipped with the rotary latch lever arm, which in turn interacts with the sensor, and since the interaction with the rotary latch is carried out by the rotary latch arm, the guide slot in question is typically located on said rotary latch lever arm.

This means that the spring engages with its rotary latch limb through the said guide slot on the contact element, which in turn is provided and realized on the rotary latch lever arm. In this manner, the torsion latch limb of the spring is simultaneously bearing and guided within the guide slot on the contact element. This makes it easy to use the rotary latch limb to scan the outer circumference of the rotary latch. In fact, the rotary latch limb usually has a nose at the end for this purpose, which is used to scan the outer circumference of the rotary latch.

Due to the design described above, the spring can be tensioned as a whole between the housing stop on the one hand and the rotary latch on the other as soon as the nose provided at the end of the rotary latch limb comes into plant contact with the outer circumference of the rotary latch. This is typically the case when the rotary latch is closed or has not (yet) reached its fully open position. Only when the rotary latch is fully open can the rotary latch limb or the nose at the end no longer interact with the rotary latch or has the outer circumference of the rotary latch moved so far away from the rotary latch limb that it is at a distance from it.

The opening process of the rotary latch and thus of the locking mechanism as a whole is usually connected with the fact that the sensor biased by the contact element does not emit a signal. This is associated with the fact that the rotary latch arm interacting with the sensor as part of the contact element leaves the sensor, which is usually fixed in a housing of the motor vehicle lock. For example, the sensor may be a Hall sensor that reacts to the approach of a permanent magnet on or in the rotary latch lever arm.

As long as the permanent magnet in question in or on the rotary latch lever arm and the Hall sensor cover one another, the sensor sends a signal to an associated control unit. This is the case when the rotary latch and the pawl are in their closed position. Each opening movement of the locking mechanism causes the contact element to swivel around its axis and at the same time the rotary latch arm with its permanent magnet attached to or within it leaves the Hall sensor in the example case. This means that no signal is sent to the control unit. The sensor is only biased again when the locking mechanism has (re) assumed its closed position after an opening process in such a manner that the pawl has not only fallen into a possible pre-latch of the rotary latch, but into a main latch and the locking mechanism has thus assumed its main closed position. This is because the main locking position of the locking mechanism corresponds to the contact element having been pivoted about its axis to such an extent that the rotary latch lever arm or the permanent magnet provided there completely covers the Hall sensor in the example case. —Of course, it is also possible to work with a reversed signal sequence in such a manner that the main locking position does not correspond to any signal from the sensor, while any deviation from this results in a signal.

In this manner, the invention, taking into account a compact and simple construction, is able to permanently detect the safe assumption of the main locking position with the aid of the sensor. Any deviation from this leads to a missing signal. The fact that the rotary latch is scanned by the rotary latch limb of the spring and the pawl is scanned by the pawl contour on the contact element provides a functional solution for scanning both locking mechanism components that does not require a specific contour of the spring. The same applies to the contact element, especially as this is usually designed as an injection-molded plastic part anyway. As a result, permanent functionality is observed and any temperature or other climatic effects do not play a role. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
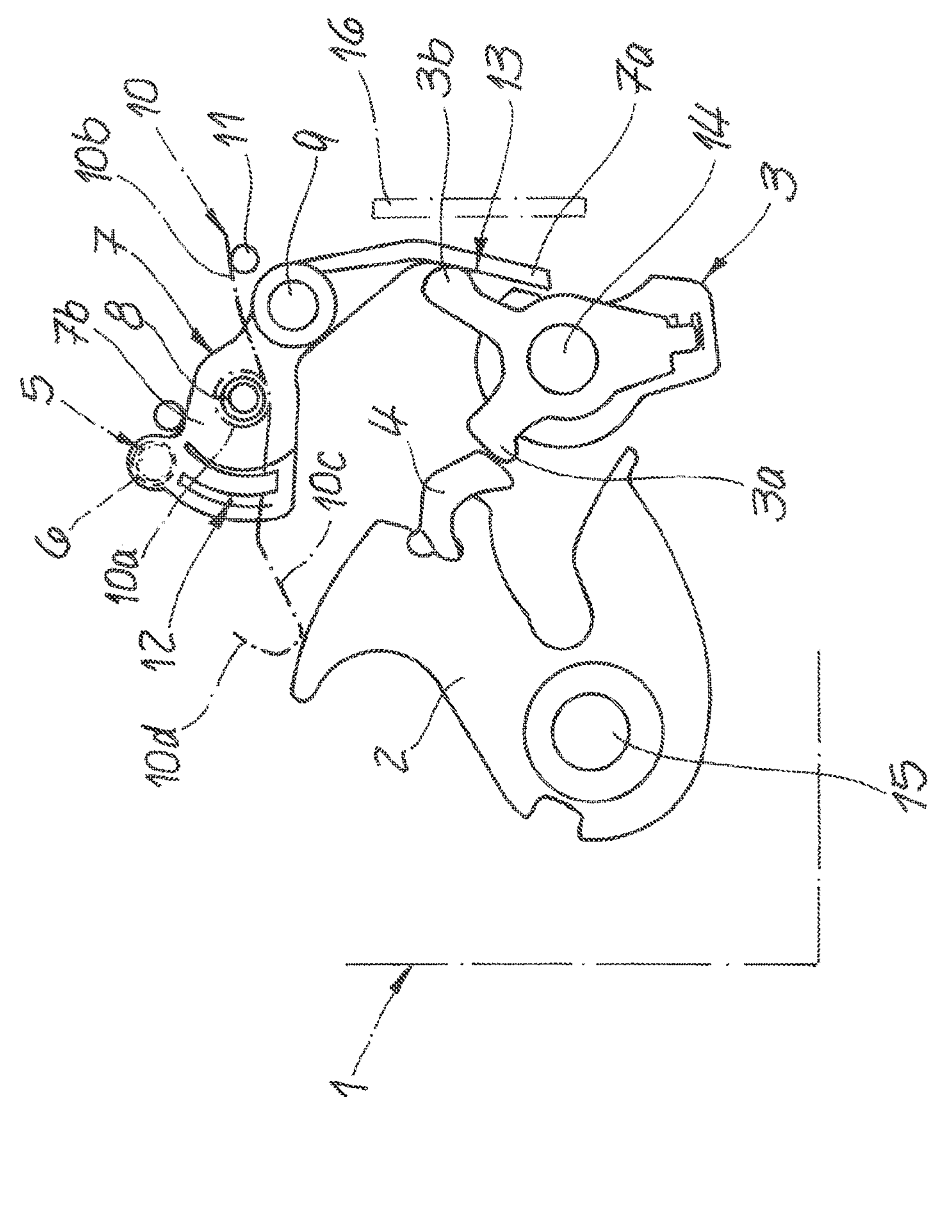
FIG. 1 shows the motor vehicle lock according to the invention in the main latching position or main locking position.

In the figures, a motor vehicle lock is represented, which is not restrictively a motor vehicle door lock, which is accommodated inside a housing 1 which is merely indicated. For this purpose, the motor vehicle lock or motor vehicle door lock has a locking mechanism 2, 3 consisting substantially of the locking mechanism components 2, 3, namely a rotary latch 2 and a pawl 3. The representations show that the rotary latch 2 is equipped with a latching element 4 arranged in the engagement area between the two locking mechanism components 2, 3, which, according to the exemplary embodiment, is pivotally mounted on the rotary latch 2 in a locking plane. The locking plane is spanned by the two locking mechanism components 2, 3 and coincides with the drawing plane in the representations.

An embodiment of the locking mechanism 2, 3 in such a manner with a latching element 4 arranged between the two locking mechanism components 2, 3 is described in detail by way of example in DE 10 2019 123 837 A1 of the applicant. In principle, however, a locking mechanism 2, 3 could also be used at this location, in which a so-called carrier pawl is rotatably mounted on the pawl 3, as described in DE 10 2009 029 023 A1 of the applicant. In addition, embodiments entirely without a latching element 4 or carrier pawl are of course also provided for and comprised.

The motor vehicle lock and particularly the motor vehicle door lock according to the invention is furthermore equipped with at least one sensor 5, 6 for sensing the position of the rotary latch 2 and the pawl 3. According to the exemplary embodiment and not restrictively, the sensor 5, 6 is designed in two parts, namely has on the one hand a Hall sensor 5 fixedly mounted in or on the housing 1 and on the other hand a permanent magnet 6, which finds its arrangement on or in a contact element 7 to be described in more detail below.

Figure 6:
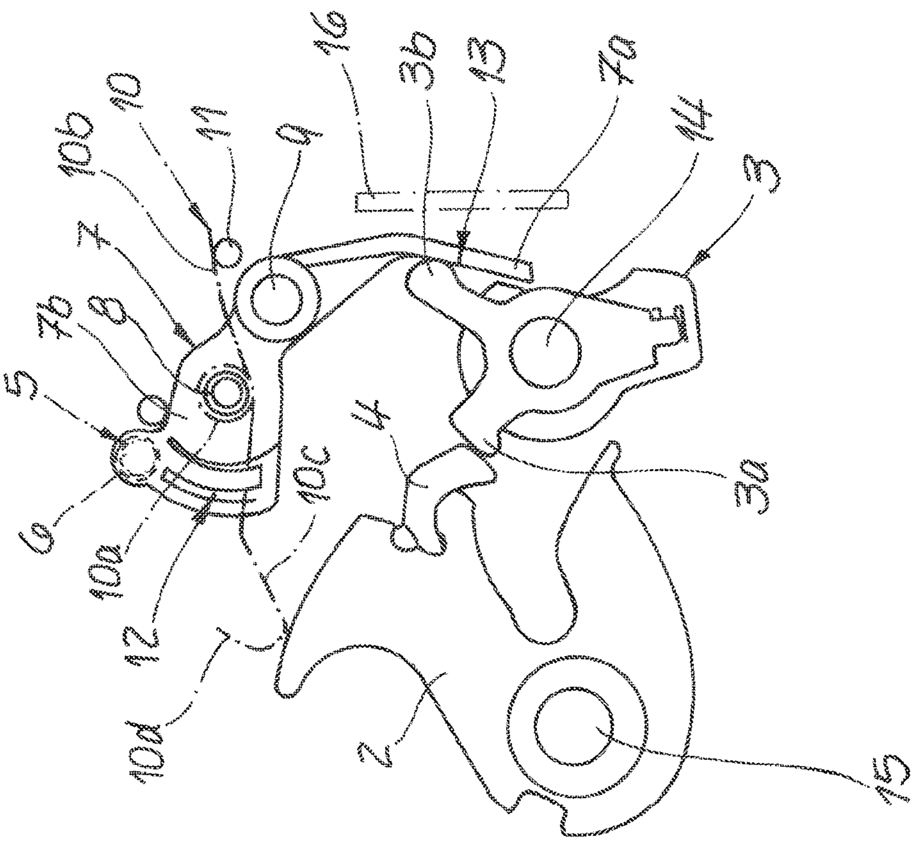
FIG. 6 shows the locking mechanism in the main locking position as shown in the representation in FIG. 1.

The sensor 5, 6 then sends a sensor signal to a control unit not explicitly shown when the Hall sensor 5 overlaps with the aid of the permanent magnet 6 or when the permanent magnet 6 covers the Hall sensor 5. According to the exemplary embodiment, this is the case if and only if the locking mechanism 2, 3 has assumed its main locking position or main detent position, as shown in FIG. 1 and FIG. 6. Any deviation from this main locking position or main latching position causes the permanent magnet 6 to move away from the Hall sensor 5, so that in this case the signal in question is not (or no longer) output to the control unit.

The contact element 7 mentioned above is designed to rotate about an axis 9. According to the exemplary embodiment, the axle 9 is defined by a stationary bearing bolt 9. The bearing bolt 9 may be connected to the housing 1 for this purpose or may in principle also be an integral part of this housing 1, which is usually designed as an injection-molded plastic part. As already explained, the sensing element 7 is generally likewise made of plastic or is a plastic injection-molded part, so that a bearing collar 8 also generally represents an integral component of the sensing element 7.

In addition, the basic construction includes a spring 10, with the help of which the contact element 7 is biased. The contact element 7 is arranged between the sensor 5, 6 and the associated locking mechanism component 2, 3. It can be seen that the spring 10 is designed in three parts. In fact, the spring 10 initially has a winding portion 10*a*, from which two limbs 10*b*, 10*c* extend according to the exemplary embodiment.

According to the invention, the design is such that the spring 10 surrounds the bearing collar 8 with its winding portion 10*a*. As a result, the spring 10 is mounted on the contact element 7. In addition, the spring 10 with the two addressed limb 10*b*, 10*c* on both sides ensures interaction with the rotary latch 2 on the one hand and a housing stop 11 on the other.

In fact, the design is such that the one limb 10*b* extending from the central winding portion 10*a* of the spring 10 is designed as a housing limb 10*b*. The housing limb 10*b* rests against the housing stop 11 and is supported against it. According to the exemplary embodiment, the winding portion 10*a* encloses the bearing collar 8 of the contact element 7.

In contrast, the other second limb 10*c* of the spring 10 is designed as a torsion latch limb 10*c*. A position of the rotary latch 2 can be scanned using the rotary latch limb 10*c*. For this purpose, the rotary latch limb 10*c* in question interacts with the rotary latch 2 on the outer circumference.

The exemplary embodiment shows that both limbs 10*b*, 10*c* are opposite to one another and are each connected tangentially to the central winding portion 10*a*. In addition, the two limbs 10*b*, 10*c* generally form an angle of approximately 180° between them.

To guide the rotary latch limb 10*c*, the rotary latch limb 10*c* of the spring 10 passes through a guide slot 12 on the contact element 7. Like the previously mentioned collar 8 on the contact element 7, the guide slot 12 is also an integral part of the plastic contact element 7. In this manner, the rotary latch limb 10*c* is guided relative to the contact element 7. In addition, the rotary latch limb 10*c* in question is equipped with an end-side nose 10*d*, which is configured and designed to scan the outer circumference of the rotary latch 2.

The mode of operation is as follows. In FIG. 1, the motor vehicle lock or its locking mechanism 2, 3 is in the main latching position or main locking position. This is characterized by the fact that the pawl 3 rests with an arm 3*a* against the latching element 4 and the rotary latch 2 is latched in this main latching position. In contrast, another arm 3*b* of the pawl 3 rests against a pawl contour 13 as part of the contact element 7.

In fact, according to the exemplary embodiment, the contact element 7 as a whole is designed as a two-arm lever with a pawl lever arm 7*a* and a rotary latch lever arm 7*b*. The pawl lever arm 7*a* has the pawl contour 13 for sensing the pawl 3. In contrast, the rotary latch arm 7*b* interacts with the sensor 5, 6, namely, according to the exemplary embodiment, it is equipped with the permanent magnet 6 as a component of the sensor 5, 6. For this purpose, the permanent magnet 6 may, for example, be embedded in a cut-out in the rotary latch lever arm 7*b*.

Figure 2:
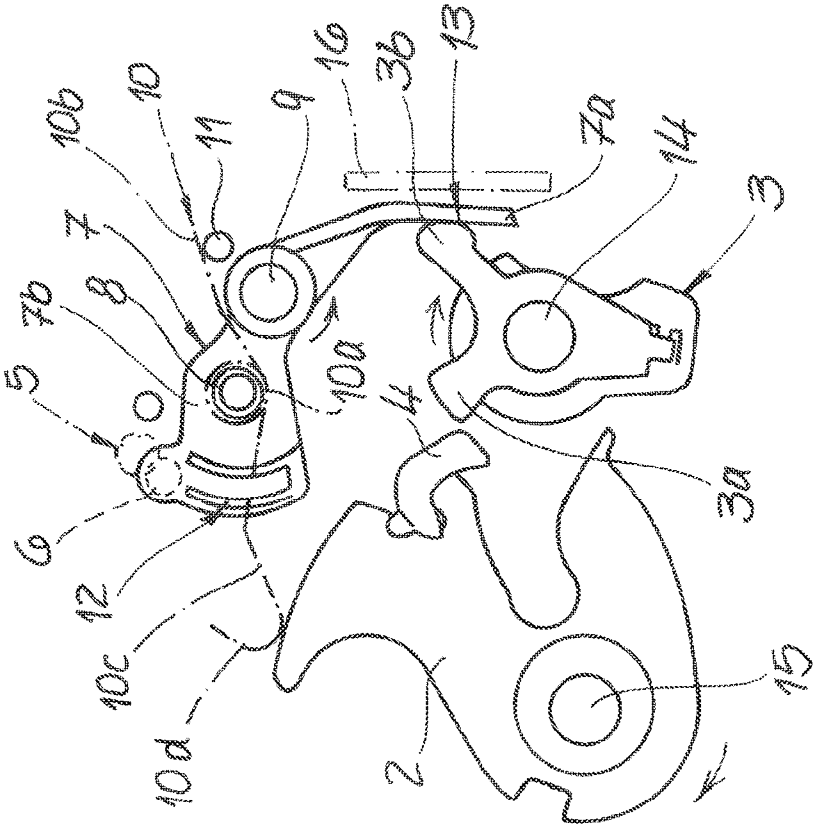
FIG. 2 shows an opening process starting from the functional position shown in FIG. 1.

If the locking mechanism 2, 3 is now opened starting from the main locking position or main detent position according to FIG. 1, this presupposes that the pawl 3 is biased about its axis 14 according to the exemplary embodiment, namely in a clockwise direction, as can be seen in the conversion from FIG. 1 to FIG. 2. As a result of this, the pawl arm 3*b* biases the pawl contour 13 and ensures that the contact element 7 or the two-arm lever is pivoted counterclockwise about its axis 9 during the transition from FIG. 1 to FIG. 2.

A further housing stop 16 may be assigned to the pawl arm 7*a* of the contact element 7, which may limit the opening movements of the pawl 3. The opening of the pawl 3 during the transition from FIG. 1 to FIG. 2 is carried out manually, for example, by biasing the pawl 3 via an operating lever chain (not expressly shown) and a door handle (inside door handle and/or outside door handle). As a rule, however, the pawl 3 is actuated by an electric motor to open it electrically.

Because the pawl 3 has been pivoted clockwise about its axis 14 during the transition from FIG. 1 to FIG. 2, the further pawl arm 3*a* leaves the latching element 4 on the rotary latch 2. As a result, during the transition from FIG. 2 to FIG. 3, the rotary latch 2 can swing open around its axis 15, in a clockwise direction. Furthermore, since during the transition from FIG. 1 to FIG. 2 the contact element 7 has been biased counterclockwise about its axis 9—as described—the permanent magnet 6 leaves the position of the Hall sensor 5, so that as a result the sensor signal originally emitted by the sensor 5, 6 to the control unit is no longer observed. The same applies in the functional position shown in FIG. 3. At the same time, it can be seen that the pivoting movement of the contact element 7 about its axis 9 in an anticlockwise direction causes the pivot latch 10*c* of the spring 10 inside the guide slot 12 to move "upwards" according to the exemplary embodiment. This is possible because the pivot limb 10*c* of the spring 10 is elastically deformed.

Figure 3:
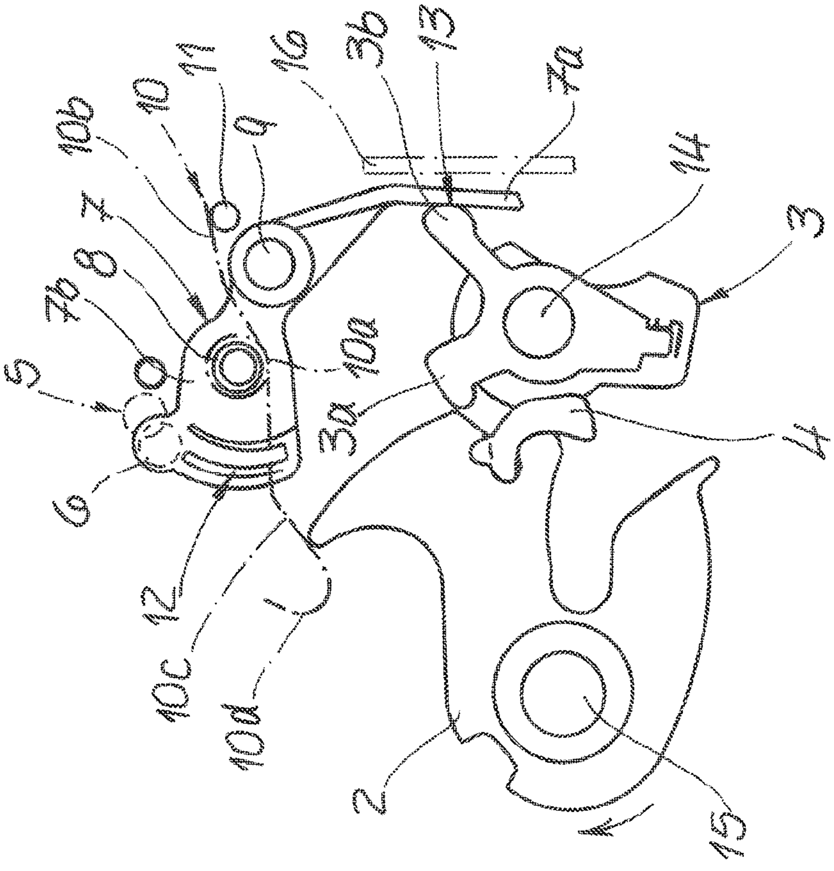
FIG. 3 shows the continuous opening process.

In the representation according to FIG. 3, the rotary latch leg 10*c* of the spring 10 or the end nose 13 is still in contact with an outer circumference of the rotary latch 2. As the rotary latch 2 continues to open during the transition from FIG. 3 to FIG. 4, it can now be observed that the rotary latch 2 moves away from the spring 10 or the rotary latch limb 10*c* and the rotary latch limb 10*c* no longer rests against the rotary latch 2 in the fully open position of the locking mechanism 2, 3 in FIG. 4. The pawl 3 has substantially retained its position during the transition from FIG. 3 to FIG. 4, so that overall the contact element 7 also remains in the same position as it was in FIG. 2. As a result, the sensor 5, 6 still does not send a signal to the control unit. The contact element 7 is actually held in connection with the pawl 3 by the spring 10, because although the rotary latch limb 10*c* has relaxed during the transition from FIG. 2 via FIG. 3 to FIG. 4, at the same time the housing limb 10 *b* is still in contact with the housing stop 11. As a result, the contact element 7 is held in position by the winding portion 10*a* surrounding the bearing collar 8.

Figure 4:
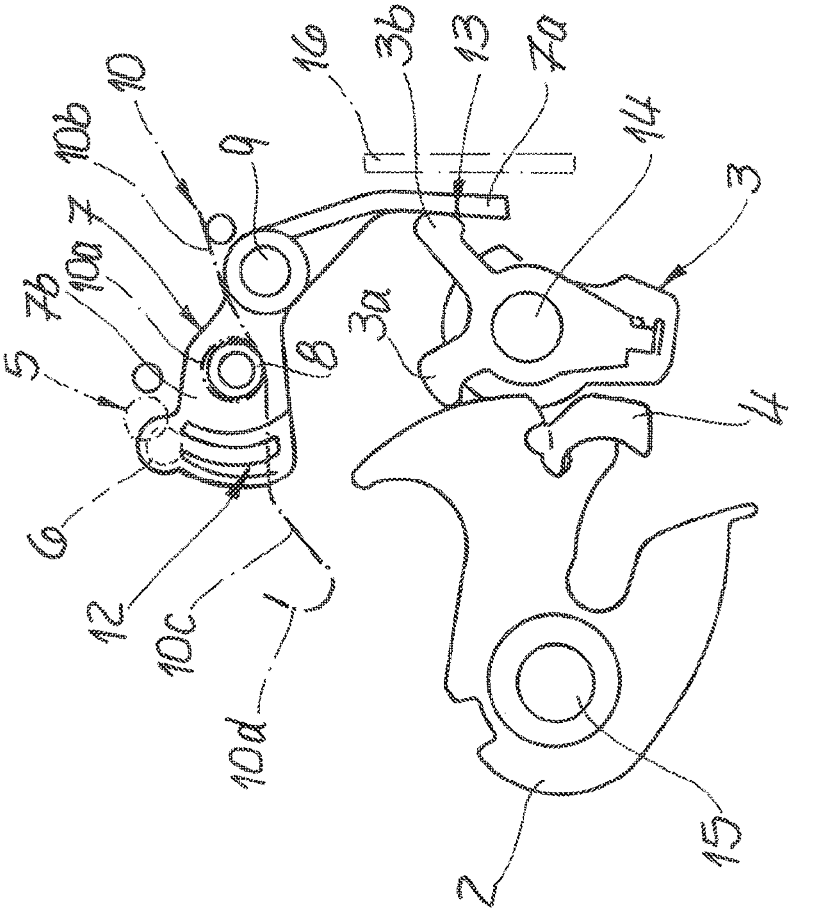
FIG. 4 shows the locking mechanism of the motor vehicle lock in the fully open state.

Starting from the fully open position in FIG. 4, a closing process of the locking mechanism 2, 3 is subsequently described with reference to FIG. 5 and FIG. 6. In fact, the closing process at the transition from FIG. 4 to FIG. 5 corresponds to the rotary latch 2 being pivoted counterclockwise about its axis 15. For this purpose, a locking bolt not expressly shown may move into the open rotary latch 2 and ensure the described pivoting movement of the rotary latch 2 about its axis 15 in an anticlockwise direction during the transition from FIG. 4 to FIG. 5. During this process and in accordance with the representation in FIG. 5, the pawl 3 can now move with its pawl arm 3*a* against a pre-latch of the rotary latch 2 or fall into this pre-latch, as shown in FIG. 5.

In this case, an outer circumference of the rotary latch 2 may also come into contact with the rotary latch leg 10*c* of the spring 10. At the same time, however, the contact element 7 is held unchanged in its position during the transition from FIG. 4 to FIG. 5. This is ensured by the spring 10, which now ensures that the contact element 7 retains its position as shown in FIGS. 2 to 4 by means of the rotary latch leg 10*c* resting against the rotary latch 2 on the one hand and the housing leg 10*b* resting against the housing stop 11 on the other. As a result, the sensor 5, 6 still does not send a signal to the control unit, which is not shown.

Figure 5:
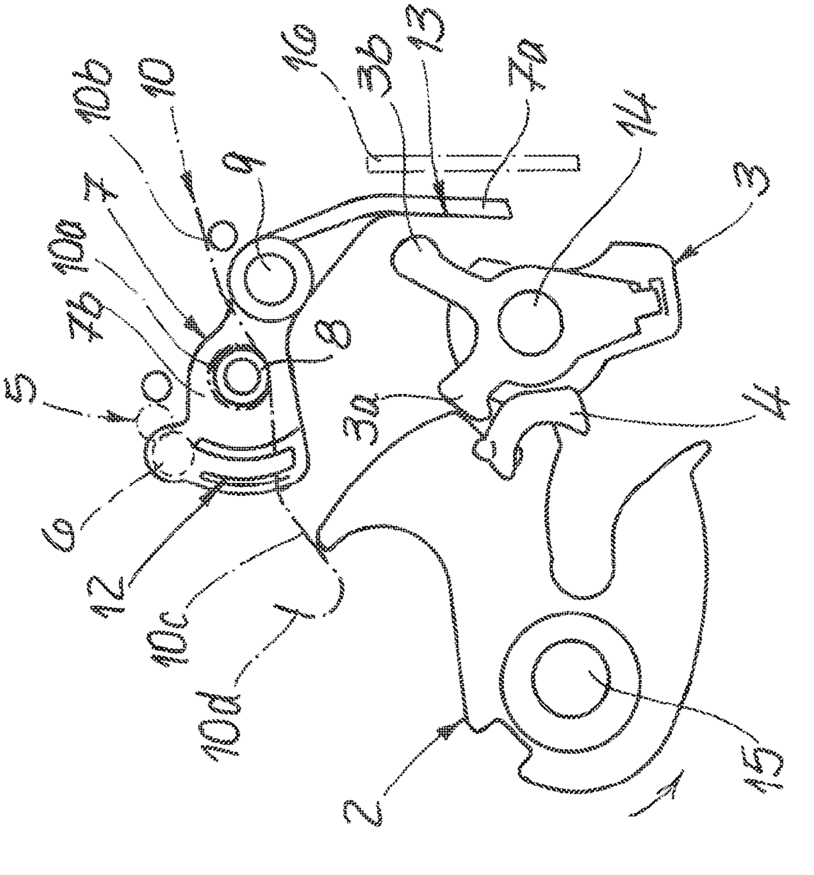
FIG. 5 shows a closing process starting from the open position of the locking mechanism shown in FIG. 4 with the locking mechanism in the pre-engaged position.

If the locking mechanism 2, 3 now progresses from FIG. 5 to FIG. 6, this corresponds to a further counter-clockwise movement of the rotary latch 2 by the retracting locking bolt. This can be seen in the transition from FIG. 5 to FIG. 6. During this process, the pawl arm 3*a* finally drives against the front of the latching element 4, which is rotatably mounted on the rotary latch 2. The main latching position or main locking position of the locking mechanism 2, 3 is now reached, as also observed at the beginning in FIG. 1. At the same time, during the transition from FIG. 5 to FIG. 6, the rotary latch 2 moving into the main locking position causes the rotary latch limb 10*c* of the spring 10 to be biased by the outer circumference of the rotary latch 2 in such a manner that the contact element 7 as a whole is biased clockwise about its axis 9, allowing the pawl arm 7*a* to come into contact with the arm 3*b* of the pawl 3 with its pawl contour 13. This pivoting movement of the contact element 7 in a clockwise direction causes the permanent magnet 6 on the rotary latch arm 7*b* of the contact element 7 to move in the direction of the Hall sensor 5 and overlap with it, so that the sensor 5, 6 now emits a signal to the control unit. This means that the signal from the sensor 5, 6 indicates that the main latching position or main locking position of the locking mechanism 2, 3 has been reached again, as was already the subject matter of FIG. 1, which shows the starting point.

LIST OF REFERENCE NUMBERS housing 1
locking mechanisms 2, 3
rotary latch 2
Pawl 3
arm 3*a*
arm 3*b*
latching element 4
Sensor 5,6
Hall sensor 5
permanent magnet 6
contact element 7
pawl lever arm 7*a*
rotary latch lever arm 7*b*
axis 9
bearing collar 8
bearing bolt 9
spring 10
winding portion 10*a*
housing limb/limb 10*b*, 10*c*
end nose 10*d*
housing stop 11
guide slot 12
pawl contour 13
axis 14
axis 15
housing stop 16

The invention claimed is:

1. A motor vehicle lock comprising:
- a locking mechanism comprising locking mechanism components including at least a rotary latch and a pawl,
- at least one sensor for sensing a position of the rotary latch and the pawl,
- at least one contact element biased by a spring positioned between the sensor and one of the locking mechanism components, wherein the contact element is rotatable about an axis, and
- a housing including a housing stop,
- wherein the spring is mounted on the contact element and equipped with limbs on both sides for directly engaging the rotary latch and the housing stop.

2. The motor vehicle lock according to claim 1, wherein the spring is a torsion spring and the limbs include a rotary latch limb that directly engages the rotary latch and a housing limb that directly engages the housing stop.

3. The motor vehicle lock according to claim 1, wherein the limbs are opposite one another with respect to a central winding portion of the spring.

4. The motor vehicle lock according to claim 3, wherein the limbs are each connected tangentially to the winding portion and enclose an angle of approximately 180° between the limbs.

5. The motor vehicle lock according to claim 3, wherein the contact element includes a bearing collar, and the winding portion coaxially encloses the bearing collar of the contact element.

6. The motor vehicle lock according to claim 2, wherein the rotary latch limb of the spring engages the rotary latch through a guide slot on the contact element.

7. The motor vehicle lock according to claim 2, wherein the rotary latch limb has an end-side nose for sensing an outer circumference of the rotary latch.

8. The motor vehicle lock according to claim 1, wherein the contact element is a two-arm lever including a pawl lever arm that engages with the pawl and a rotary latch lever arm opposite from the pawl lever arm.

9. The motor vehicle lock according to claim 8, wherein the pawl lever arm has a pawl contour for sensing the pawl.

10. The motor vehicle lock according to claim 8, wherein the rotary latch lever arm interacts with the sensor.

11. The motor vehicle lock according to claim 6, wherein the contact element is a two-arm lever including a pawl lever arm that engages with the pawl and a rotary latch lever arm that interacts with the sensor, and the guide slot is located on the rotary latch lever arm.

12. The motor vehicle lock according to claim 1, wherein the sensor is fixed to the housing.

13. The motor vehicle lock according to claim 8, wherein the sensor is a Hall sensor and a permanent magnet that interacts with the Hall sensor is located on the rotary latch lever arm.

14. The motor vehicle lock according to claim 13, wherein in a main latching position of the locking mechanism, the spring is in direct engagement with the rotary latch and the permanent magnet covers the Hall sensor.

15. The motor vehicle lock according to claim 13, wherein in a pre-latching position of the locking mechanism, the spring is in direct engagement with the rotary latch and the permanent magnet is spaced from the Hall sensor.

16. The motor vehicle lock according to claim 13, wherein in an open position of the locking mechanism, the spring disengages from the rotary latch and the permanent magnet is spaced from the Hall sensor.

17. The motor vehicle lock according to claim 1, wherein the axis of rotation of the contact element is defined by a bearing bolt connected to the housing.

18. A motor vehicle lock comprising:
- a locking mechanism comprising locking mechanism components including at least a rotary latch and a pawl, at least one sensor for sensing a position of the rotary latch and the pawl, at least one contact element biased by a spring positioned between the sensor and one of the locking mechanism components, wherein the contact element is rotatable about an axis, and a housing including a housing stop, wherein the spring is mounted on the contact element and equipped with limbs on both sides for interaction with the rotary latch and the housing stop, wherein the spring is a torsion spring and the limbs include a rotary latch limb that engages with the rotary latch and a housing limb that engages with the housing stop, and wherein the rotary latch limb has an end-side nose for sensing an outer circumference of the rotary latch.

* * * * *